United States Patent
Grenier et al.

(10) Patent No.: US 9,686,412 B2
(45) Date of Patent: Jun. 20, 2017

(54) SYSTEM AND METHOD FOR OFFLINE VOICEMAIL DEPOSIT

(71) Applicants: Louis Grenier, Pincourt (CA); Donato Proce, Laval (CA)

(72) Inventors: Louis Grenier, Pincourt (CA); Donato Proce, Laval (CA)

(73) Assignee: Telefonaktiebolaget LM Ericcson (publ), Stockholm ( * ) Notice: Subject to any disclaimer, the term of this patent is extended or adjusted under 35 U.S.C. 154(b) by 0 days.

(21) Appl. No.: 15/043,868

(22) Filed: Feb. 15, 2016

(65) Prior Publication Data

US 2016/0165053 A1 Jun. 9, 2016

Related U.S. Application Data

(63) Continuation of application No. 13/940,795, filed on Jul. 12, 2013, now Pat. No. 9,294,889.

(60) Provisional application No. 61/671,347, filed on Jul. 13, 2012.

(51) Int. Cl.
*H04W 4/12* (2009.01)
*H04M 3/533* (2006.01)
*H04L 12/58* (2006.01)

(52) U.S. Cl.
CPC ........ *H04M 3/53366* (2013.01); *H04L 51/10* (2013.01); *H04W 4/12* (2013.01); *H04M 2201/16* (2013.01)

(58) Field of Classification Search
None
See application file for complete search history.

(56) References Cited

U.S. PATENT DOCUMENTS

| | | | |
|---|---|---|---|
| 6,324,265 B1 | 11/2001 | Christie | |
| 7,532,710 B2 | 5/2009 | Caputo et al. | |
| 7,907,707 B2 | 3/2011 | Goel et al. | |
| 9,374,433 B2* | 6/2016 | Maeng | H04M 1/72547 |
| 2005/0059384 A1 | 3/2005 | Kuusinen | |
| 2010/0056120 A1 | 3/2010 | Olrog | |
| 2013/0013411 A1* | 1/2013 | Jenkins | H04L 51/38 705/14.58 |
| 2013/0094443 A1* | 4/2013 | Hyytia | H04L 45/00 370/328 |

(Continued)

FOREIGN PATENT DOCUMENTS

WO 2006008713 1/2006

OTHER PUBLICATIONS

Frey, Richard, International Search Report, PCT/IB2013/05571, European Patent Office, Rijswijk, The Netherlands, Nov. 28, 2013.

*Primary Examiner* — Diane Mizrahi
(74) *Attorney, Agent, or Firm* — David Rahmer; Ericsson Canada Inc.

(57) ABSTRACT

Systems and methods for an offline voicemail recording system are provided. A voicemail server establishes a session with a caller responsive to detecting the unavailability of a callee. Session information is transmitted to the caller and the voicemail server then purposely terminates the session with the caller. The caller can record a voice or video message offline, without an active connection to the voicemail server, and later upload the recorded message. The voicemail server correlates the uploaded message with the previously terminated session and notifies the callee of the receipt of the message.

24 Claims, 6 Drawing Sheets

(56) References Cited

U.S. PATENT DOCUMENTS

2015/0177974 A1\* 6/2015 Lu ..................... G06F 3/04847
　　　　　　　　　　　　　　　　　　　　　　715/752
2016/0165053 A1\* 6/2016 Grenier ................ H04W 4/12
　　　　　　　　　　　　　　　　　　　　　　455/413

\* cited by examiner

SYSTEM AND METHOD FOR OFFLINE VOICEMAIL DEPOSIT

CROSS-REFERENCE TO RELATED APPLICATION

This application claims the benefit of priority to previously filed U.S. Provisional Patent Application No. 61/671,347 entitled "SYSTEM AND METHOD FOR OFFLINE VOICEMAIL DEPOSIT" and filed on Jul. 13, 2012, and to previously filed U.S. patent application Ser. No. 13/940,795 entitled "SYSTEM AND METHOD FOR OFFLINE VOICEMAIL DEPOSIT" and filed on Jul. 12, 2013, the contents of which are incorporated herein by reference.

TECHNICAL FIELD

This disclosure relates generally to generally relate to telecommunications and more specifically to techniques for recording and storing voice or video messages in a user's voicemail inbox.

BACKGROUND

When a caller calls a callee and the callee does not answer the call, the call can be diverted to a voicemail system which will answer the call. The voicemail system allows the caller to leave a voicemail message for the callee. When the caller is finished leaving the voicemail message, the connection to the callee's voicemail system is ended.

In existing server side voice/video mail systems, during a deposit of a voice/video message, the end user records "live" their message to a party on the server side. When recording real-time or live voice or video messages, users may encounter network latency, voicemail server issues, bad coverage, or be in an environment that may not be suitable to leave a message (e.g. driving a car). If the user experiences an interruption and is not able to record his message in real-time, the call ends, and the user must retry his call at a later time.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for offline message recording, performed by a network voicemail server. The voicemail server establishes a session with a first user terminal in response to detecting an unavailability of a second user terminal. An instruction to perform an offline recording is transmitted to the first user terminal. The session with the first user terminal is terminated. An offline recorded message is received from the first user terminal, and a notification is transmitted to the second user terminal of receipt of the offline recorded message.

In an embodiment of the first aspect, the step of detecting an unavailability of the second user terminal is performed responsive to receiving an unavailable status message from the second device. Alternatively, the step of detecting an unavailability of the second user terminal is performed responsive to receiving a session invitation redirected from the second user terminal.

In another embodiment, the method includes the step of transmitting a personal greeting associated with the second user terminal to the first user terminal.

In another embodiment, the instruction to perform an offline recording is included in an instruction to terminate the session.

In another embodiment, the received offline recorded message includes an indication that the offline recorded message is associated with the terminated session. The received offline recorded message can be correlated with the terminated session.

In a second aspect of the present invention, there is provided a voicemail server comprising a communication interface, a processor, and a memory, the memory containing instructions executable by the processor. The voicemail server is operative to establish a session with a first user terminal in response to detecting an unavailability of a second user terminal. The voicemail server transmits, through the communication interface, an instruction to perform an offline recording to the first user terminal. The session with the first user terminal is terminated. The voicemail server receives, at the communication interface, an offline recorded message from the first user terminal associated with the terminated session. A notification is transmitted to the second user terminal of receipt of the offline recorded message.

In an embodiment of the second aspect, the instruction to perform an offline recording is included in an instruction to terminate the session.

In another embodiment, the received offline recorded message includes an indication that the recorded message is associated with the terminated session.

In another embodiment, the processor is configured to correlate the received offline recorded message with the terminated session.

In a third aspect of the present invention, there is provided a method for offline message recording, performed by a first user terminal. An offline message is recorded by the user terminal in response to terminating a session with a voicemail server. The offline recorded message is transmitted to the voicemail server.

In an embodiment of the third aspect, the step of transmitting the offline recorded message to the voicemail server is performed in response to evaluating a network condition.

In another embodiment, prior to recording the offline message, the method includes initiating a call with a second user terminal, and receiving a session initiation request from a voicemail server in response to an unavailability of the second user terminal.

In another embodiment, the method includes receiving a terminate session message from the voicemail server. The terminate session message can include an instruction to perform an offline recording.

In another embodiment, an indication can be transmitted to the voicemail server hat the offline recorded message is associated with the terminated session.

In a fourth aspect of the present invention, there is provided a first user terminal comprising a communication interface, a processor, and a memory, the memory containing instructions executable by the processor. The first user terminal is operative to record an offline message in response to terminating a session with a voicemail server, and to transmit, through the communication interface, the offline recorded message to the voicemail server.

In an embodiment of the fourth aspect, the transmission of the offline recorded message is performed in response to the processor evaluating a network condition.

In another embodiment, an indication that the offline recorded message is associated with the terminated session is transmitted.

In another embodiment, the first user terminal is further operative to initiate a call with a second user terminal; to receive, at the communication interface, a session initiation request from a voicemail server in response to an unavailability of the second user terminal; and to receive, at the communication interface, a terminate session message from the voicemail server. The terminate session message can include an instruction to perform an offline recording Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present disclosure is directed to systems and methods for enabling the offline recording of a voicemail message, uploading the recorded message to a voicemail server and correlating the message with a terminated session.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

The present invention is directed to a hybrid voice/video mail solution where both the video/voice mail server and the client (i.e. the mobile phone, tablet, PC, etc.) are involved in the recording, uploading, and storage of a voice/video message. The deposit of the recorded message is the result of a network re-direction towards the callee's voice/video mail server. In embodiments of the present invention, both the server and client can use the Session Initiation Protocol (SIP) protocol, or any other appropriate protocol, for controlling the communication sessions.

The present disclosure will make reference to a network voicemail server and voicemail messages, but it will be readily appreciated by those skilled in the art that voicemail messages may contain video content, as well as conventional audio content, and can be processed by the system and methods as described herein.

When the network redirects a caller to the voicemail system of the callee, the voicemail system plays the callee's personalized greeting to the caller. This is a familiar and typical voicemail user experience. During this dialog, the voicemail server can send a SIP INFO REQUEST message to the caller with a body in plain text to convey session information.

After the personalized greeting is played (or interrupted by caller), the session is terminated and the server is disconnected from the caller's client. The caller is given the opportunity to record a voice/video message on the client, while being "offline" (i.e. there is no active session with the voicemail server). The caller can then transmit the offline recorded voice/video message to the voicemail system, with the appropriate session information, and the message will be stored in the callee's inbox.

Figure 1:
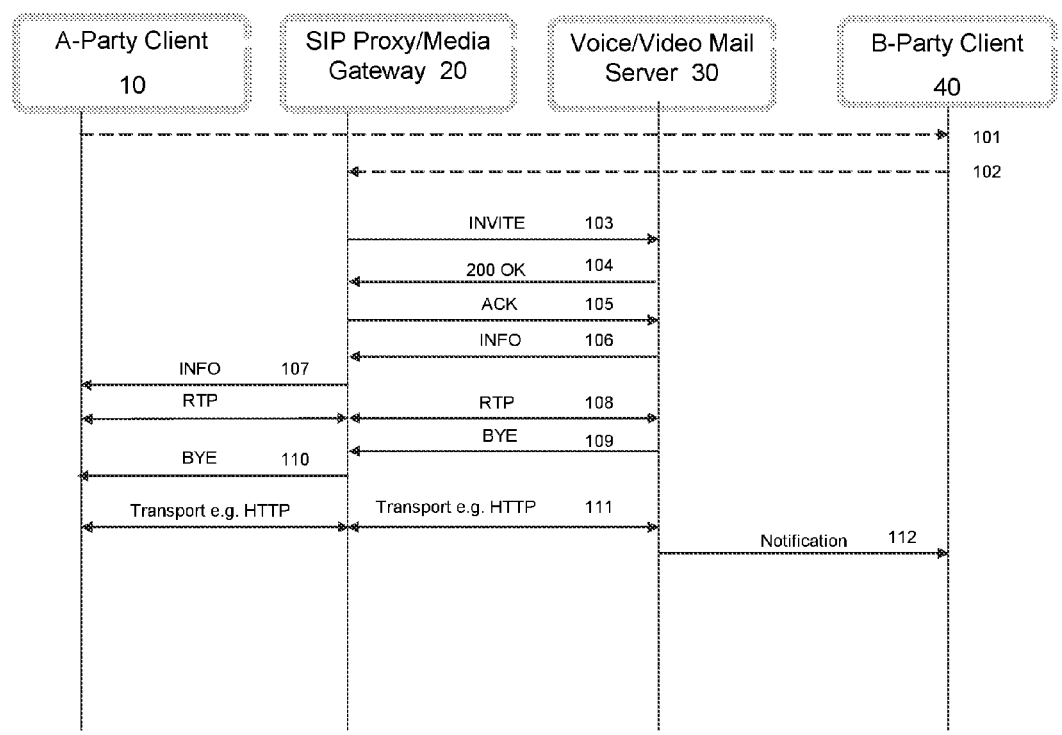
FIG. 1 is a call flow diagram.

Referring now to FIG. 1, the caller is referred to as the A-Party 10 and the callee is referred to as the B-Party 40 in this example embodiment. The SIP Proxy/Media Gateway 20 and the Voice/Video Mail Server 30 are shown as separate nodes in this embodiment, however they may be logically implemented as a single node. The SIP Proxy 20 is used for creating, modifying and terminating SIP sessions between the mobile device clients and the Voice/Video Mail Server 30. The SIP Proxy/Media Gateway 20 can be implemented as a Call Session Control Function (CSCF) node in a typical telecommunication network. The Voice/Video Mail Server 30 is configured to store messages and notify users of the presence of messages.

In this scenario, A-Party 10 calls B-Party 40, but B-Party 40 is unavailable. The network redirects the call to B-Party's voicemail server 30 via the SIP Proxy 20, as shown in lines 101 and 102 in the call flow of FIG. 1. The SIP Proxy 20 sets up the session to the voice mail server 30 using a SIP INVITE message (line 103). The SIP dialog is set up and acknowledged with 200 OK message (lines 104) and ACK message (line 105). During this SIP dialog, the voicemail server 30 sends a SIP INFO REQUEST message (line 106) with a "content type" of "text/plain" including the following information: Session Type=video or voice; Called Party=phone number; ID=numerical identification of this session. The INFO message is then relayed to the A-Party 10 (line 107).

B-Party's personalized greeting is played via the Real-time Transport Protocol (RTP) stream (line 108). Following the play of the personalized greeting (or a termination of the greeting by A-Party 10), the voicemail server 30 initiates a termination of the SIP session with A-Party 10 by sending a BYE message (lines 109, 110).

Having obtained the contents SIP INFO message body, the A-Party client 10 will have enough information to continue "offline" after the call/session is ended. Specifically, the SIP INFO REQUEST (of line 106) can convey the Session Type of the session (video or audio), the phone number of the called party (e.g. B-Party 40) and an identification (ID) of the SIP session. The client can launch an application such as audio recording or the front camera to record a video message. The contents of the audio or video message can be captured by the A-Party client 10 while offline and at a later convenient time uploaded to the voicemail server 30. The ID in the SIP INFO REQUEST (line 107) can be used to correlate the message with the terminated session when the A-Party 10 transmits message back to the voicemail server.

As shown in line 111, the A-Party 10 sends the recorded message to the voicemail server 30 along with the session information received previously in the SIP INFO message. Hypertext Transfer Protocol (HTTP) or any other appropriate protocol can be used to deliver the content and associated session information. Depending on the protocol used, the gateway 20 may not be needed in the communication path, and A-Party client 10 can communicate directly with voicemail server 30. Upon receiving the message, the voicemail server 30 can send a notification to the B-Party 40 (line 112) as an alert that a new message has arrived. The notification can be via any messaging format suitable for the particular use case, such as Short Message Service (SMS) or Multimedia Message Service (MMS).

Figure 2:
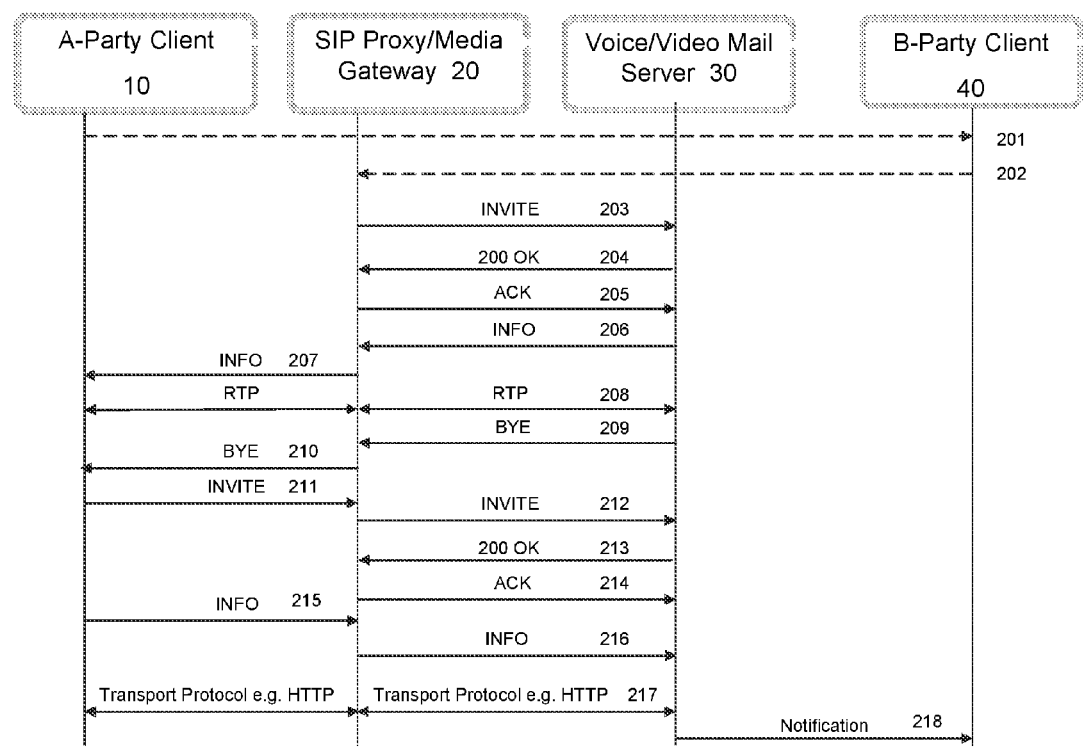
FIG. 2 is a call flow diagram.

FIG. 2 illustrates a call flow of another embodiment of the present invention. Lines 201-210 are identical to lines 101-110 of the call flow of FIG. 1. A session invitation (line 201) is diverted from an unavailable callee (B-Party 40) to a gateway 20 and a voicemail server 30 (line 202), and a session is established between the caller (A-Party 10) and the voicemail server 30 (lines 203-207). Session information is transmitted to the A-Party 10 (line 207) and a personalized greeting media is streamed (line 208). The voicemail server 30 terminates the session with the A-Party 10 following the delivery of the session information (lines 209, 210).

The INFO message (lines 206, 207) can contain additional session related information, such as:

INFO sip:1234@example.com SIP/2.0
Via: SIP/2.0/UDP voice_video@example.com:5060
From: <sip:1.1.1.1@voice_video.example.com>; tag=d3f423d
  To: <sip:A-Party@example.com>;tag=8942
  Call-ID: 312352
  CSeq: 2 INFO
  Content-Length: 24
  Content-Type: text/plain
  Session Type=video
  ID=160

In the embodiment of FIG. 2, following the offline recording of the voice/video mail message, the A-Party 10 can initiate a new SIP session with the voicemail server 30. A SIP INVITE message is sent, via the SIP Proxy 20, to the voicemail server 30 in lines 211, 212. The session is established and acknowledged in lines 213, 214. The A-Party 10 can subsequently return the session information that was previously received in the INFO message of line 207 with the INFO message of line 215, 216. The session ID in the body of the INFO message (line 215) will be the same as what was previously received, however the Session Type can be different. The voicemail server 30 can use the session ID to correlate the new session with the previously terminated session. The recorded message can then be uploaded (line 217) to the voicemail server 30 and correlated with the terminated session. Upon receiving the recorded message, the voicemail server 30 sends a notification to the B-Party 40 as an alert that a new message has arrived (line 218).

In an alternative embodiment, the respective timing of the sending of the INFO message (line 206) and the start of the RTP stream (line 208) can be reversed.

In another alternative embodiment, the INFO message transmitted from the voicemail server 30 to the A-Party 10 in lines 206, 207 is not explicitly required. In this scenario, A-Party 10 can store the Session Type (video or voice) and Called Party (phone number of B-Party) information, as this was known at the time of placing the original, unanswered call to the B-Party 40. A-Party 10 can receive the Session ID information as part of the RTP session that streams the personalized greeting from the voicemail server (line 208). A-Party 10 would then have all the information that is required to record a message offline, upload it to the server, and have it correlated to the terminated session.

On the client side, the receipt of one of the session INFO message (line 207), the RTP stream of the personalized greeting (line 208), or the BYE message (line 210) terminating the session can be used to trigger the launch of an application on the A-Party's mobile device 10. The application can be used for offline recording of the voicemail message, which can be audio and/or video depending on the indicated session type. The application can be configured to subsequently upload the message contents to the voicemail server 30 following the recording.

Figure 3:
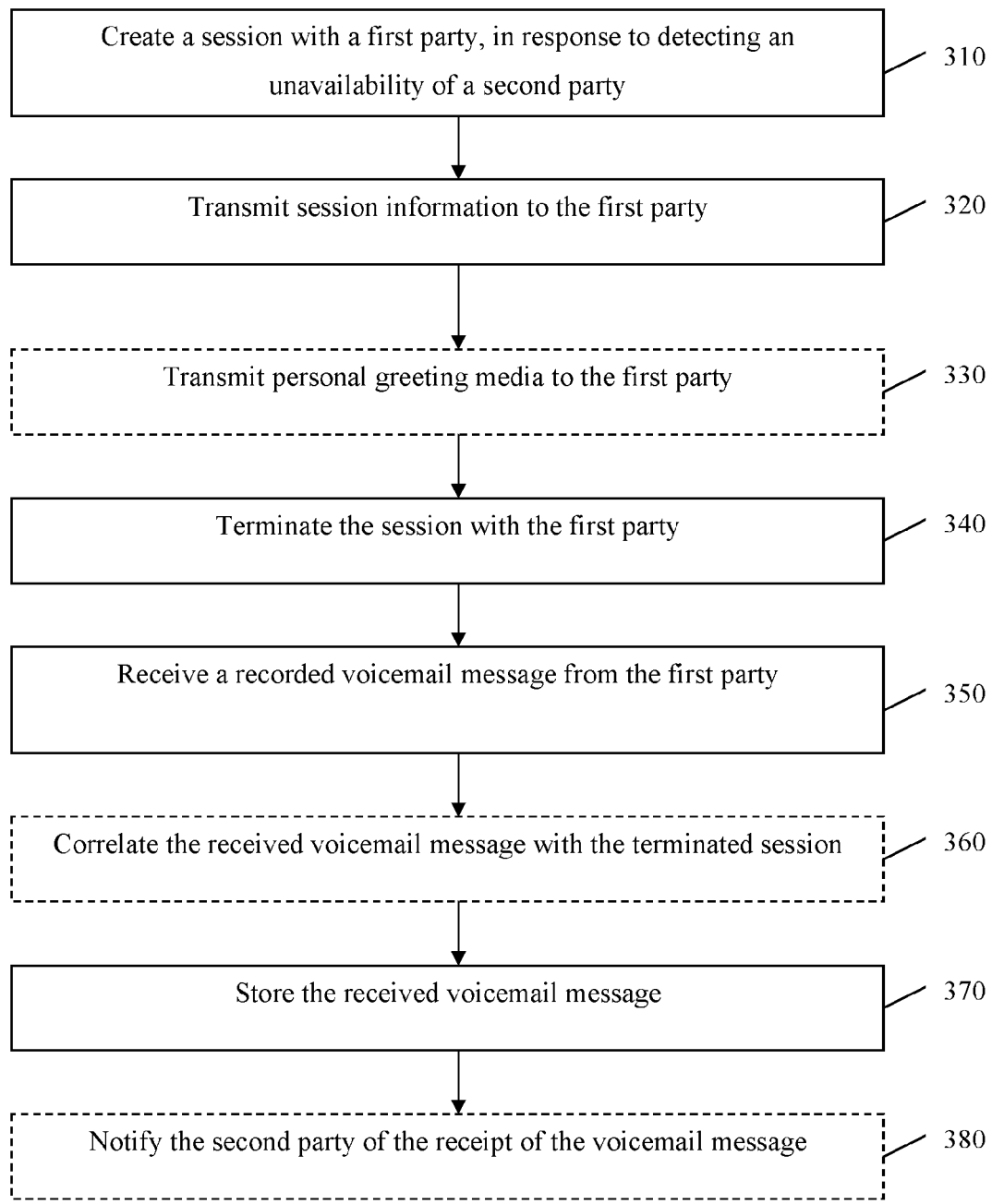
FIG. 3 is a flow chart illustrating an embodiment of the present invention.

FIG. 3 is a flow chart illustrating an embodiment of the present invention. The method of FIG. 3 can be performed by a voicemail server in a telecommunications network. The method begins by creating a session with a first party, in response to detecting an unavailability of a second party (block 310). The session can be initiated and established between the voicemail server and a mobile device associated with the first party. Detecting the unavailability of the second party can include receiving an unavailable status from a device associated with the second party. Alternatively, it can include receiving a session invitation redirected from the second party to the voicemail server. If the second party is unreachable, session requests may be automatically diverted to the voicemail server.

Session information is transmitted to the first party (block 320). The session information can include a session type (e.g. voice or video), an identifier of the called party (e.g. the second party who was determined to be unavailable) and a session identifier. Optionally, a personal greeting media can also be transmitted to the first party (block 330). The personal greeting media can be associated with the second party or the voicemail server itself. The voicemail server then terminates the session with the first party (block 340).

A recorded voicemail message is received from the first party (block 350). The recorded voicemail message can include audio and/or video content. The recorded voicemail message can also include the previously transmitted session information. Alternatively, the transmitted session information can be returned to the voicemail server in a separate message from the first party. The received voicemail message can be correlated with the terminated session (block 360). The correlation can be in accordance with the returned session information.

The voicemail server stores the received voicemail message (block 370). The step of storing can include initiating a storing of the voicemail message in a memory accessible by the voicemail server. The message storage can be local or remote. Optionally, the voicemail sever can notify the second party of the receipt of the recording voicemail message (block 380). A notification message can be sent to a device associated with the second party, so that the second can retrieve the voicemail message.

Figure 4:
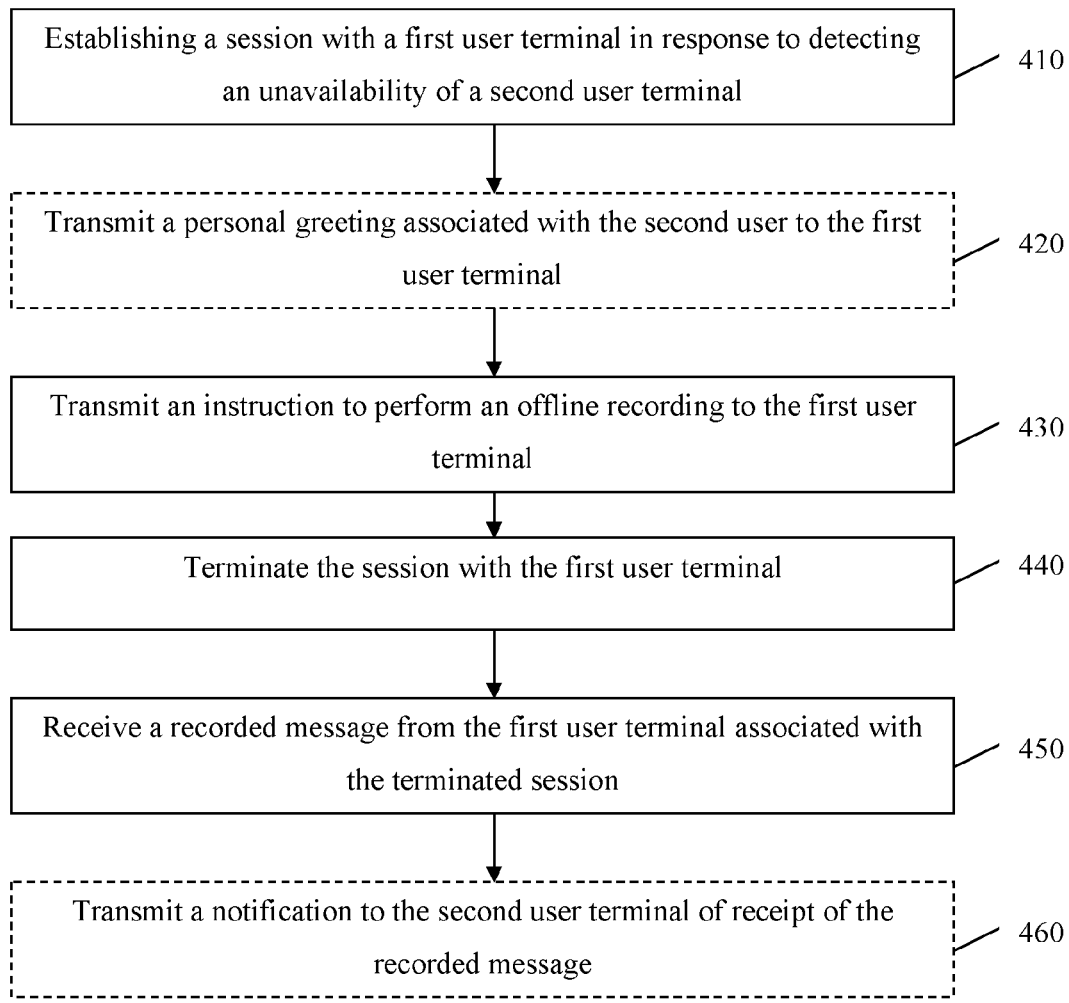
FIG. 4 is a flow chart illustrating a method performed by a voicemail server.

FIG. 4 is a flow chart illustrating another embodiment of the present invention as can be performed by a voicemail server in a telecommunications network. The process begins in step 410 by establishing a session with a first user terminal in response to detecting an unavailability of a second user terminal. The session can be initiated with the first user terminal via a SIP INVITE message or any other appropriate messaging protocol. The unavailability of the second user terminal can be determined by receiving an indication of unavailability from the second device or by receiving a session invitation redirected from the second user terminal by the network.

In step 420, a personal greeting associated with the second user can be transmitted to the first user terminal. The personal greeting can be a media file which is streamed from the voicemail server to the first user terminal. In some embodiments, the personal greeting can be a media file that was recorded by the second user and uploaded to the voicemail server. In some embodiments, the greeting can be a system message indicating that the second user is unavailable.

In step 430, an instruction to perform an offline recording is transmitted to the first user terminal. This instruction can be transmitted at the conclusion of streaming the personal greeting to the first user terminal. Alternatively, the instruction can be included in a session termination message. In step 440, the session between the voicemail server and the first user terminal is terminated.

Subsequent to the session being terminated, the voicemail server receives a recorded message from the first user terminal in step 450, the recorded message being associated with the terminated session. The voicemail server can receive session information from the first user terminal which indicates that the recorded message is associated with the terminated session. This session information can be received along with the recorded message or in a separate message. Alternatively, the voicemail server can correlate the received recorded message with the terminated message without receiving an explicit indication of the terminated session ID. The correlation can be made in accordance with the calling party, the called party, the session type or other information fields. In step 460, a notification is optionally transmitted to the second user terminal indicating receipt of the recorded message from the first user terminal.

Figure 5:
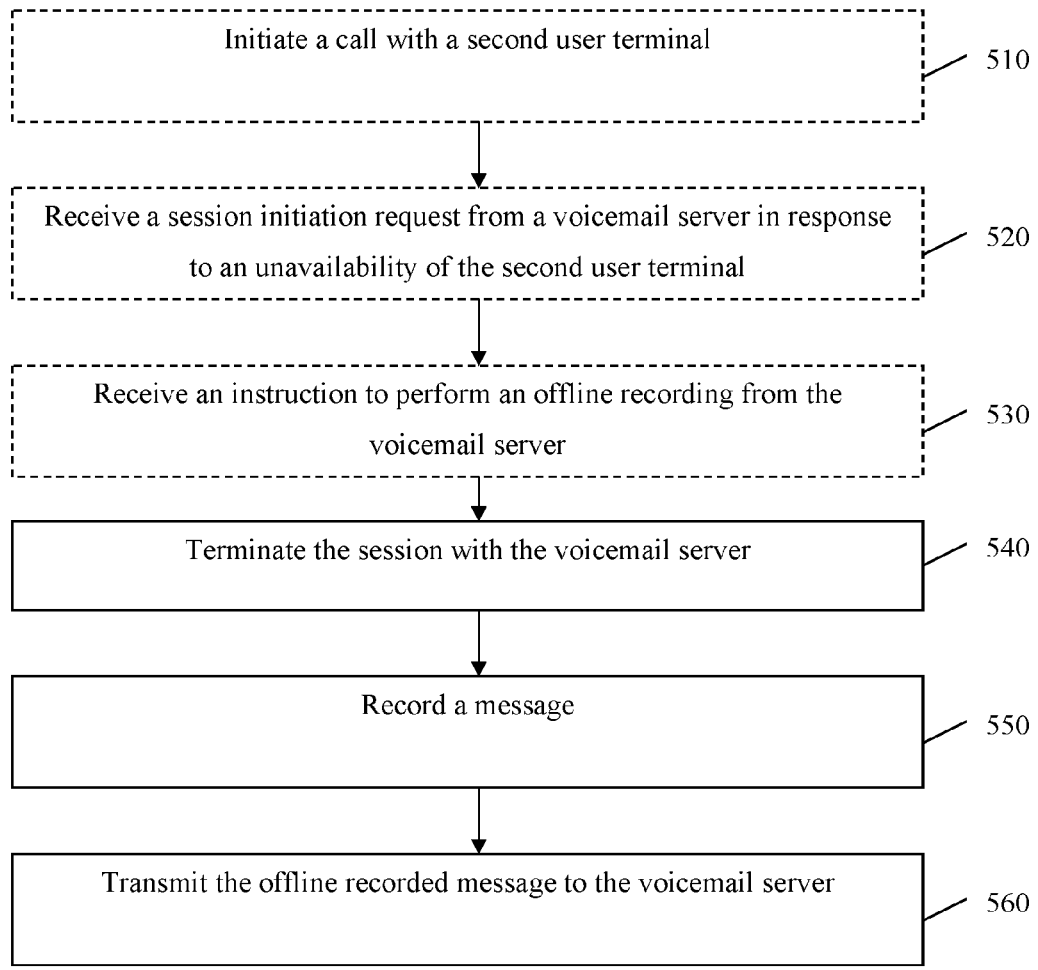
FIG. 5 is a flow chart illustrating a method performed by a user terminal.

FIG. 5 is a flow chart illustrating an embodiment of the present invention as can be performed by a user terminal in a telecommunications network. The process optionally begins in step 510 by placing or initiating a call towards a second user terminal. The second user terminal can be identified by its associated MSISDN or by other means of identification. In step 520, a session invitation is optionally received from a voicemail server in response to an unavailability of the second user terminal. A session can be established with voicemail server and session information and a personal greeting associated with the unavailable second user can be received in the session. In step 530, an instruction to perform an offline recording is optionally received from the voicemail server. The instruction to perform an offline recording can include a request to terminate the session. Alternatively, the user terminal can interpret a terminate session message as an instruction to perform an offline recording.

The session with the voicemail server is terminated in step 540. The termination can be performed in response to receiving a terminate session message from the voicemail server or, alternatively, the user terminal can initiate the termination of the session itself as described above.

Following the termination of the session, a message is recorded by the user terminal in step 550. The recorded message can be a media file including audio, video and/or multimedia content. The offline recorded message is uploaded to the voicemail server in step 560. The transmission of the offline recorded message can include an indication that it is associated with the terminated session.

In an alternative embodiment, the user terminal can establish a new second session with the voicemail server prior to uploading the offline recorded message. The user terminal can indicate to the voicemail sever that the second session is associated with, or should be correlated with, the previously terminated first session.

In another alternative embodiment, the user terminal can evaluate the network conditions prior to the transmission of the offline recorded message to the voicemail server. The user terminal can determine that the network conditions are suitable for the uploading the recorded message. This step can include checking the channel quality, error rate or other network condition indicators and comparing them to a predetermined threshold. The first user terminal can wait until the network condition(s) meet such a threshold before uploading the offline recorded message.

It will be appreciated by those skilled in the art that the term "offline" is used herein to indicate that the voicemail message is recorded in absence of an active session or connection between the user terminal and the voicemail server. The user terminal may continue to be connected to the telecommunication network, the internet, or any other local or wide area networks.

Figure 6:
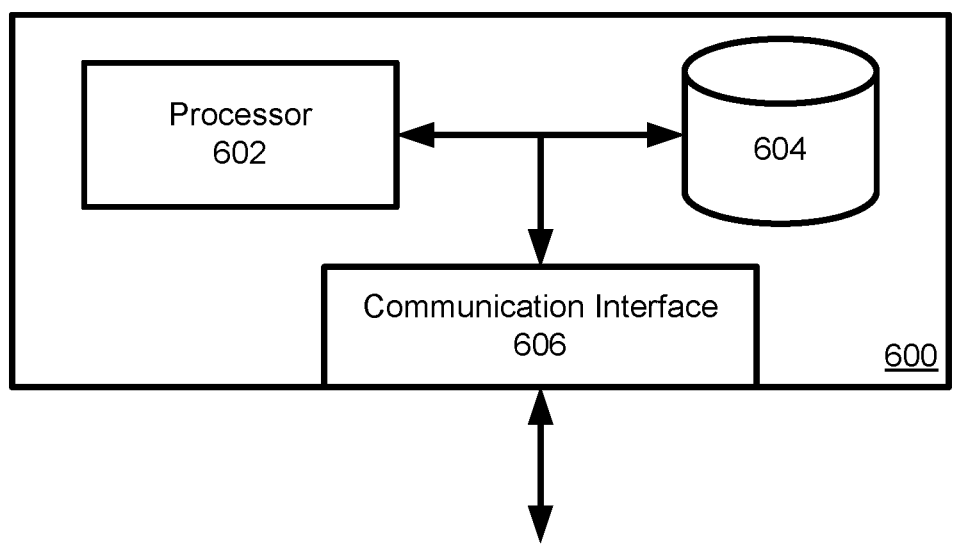
FIG. 6 is a block diagram illustrating an example apparatus according to embodiments of the present invention.

FIG. 6 is a block diagram of an apparatus configured to implement the various embodiments as disclosed herein. The node 600 can be a voicemail sever or a user terminal according to embodiments of the present invention.

The node 600 includes a processor 602, a communication interface 606 and a memory 604. The communication interface 606 is operatively connected to the processor 602. The memory 604 can be physically located internal or external to the node 600, and is accessible by the processor 602. The memory 604 contains instructions executable by the processor 602 whereby the node 600 is operative to perform the embodiments as disclosed herein.

As a voicemail server 600, the processor 602 is configured to detect an unavailability of a second user terminal and, in response, to establish a session with a first user terminal. The processor 602 instructs the communication interface 606 to transmit optional session information and a personal greeting to the first user terminal. The processor 602 instructs the communication interface 606 to transmit an instruction to perform an offline recording to the first user terminal. The voicemail server 600 terminates the session with the first party. The communication interface 606 is configured to receive a recorded message from the first user terminal. The processor 602 can correlate the received recorded message with the terminated session. The received recorded message can be stored in the memory 604. The processor 602 can send a notification, via the communication interface, to the second user terminal indicating the receipt and storage of the recorded message from the first user device.

As a user terminal 600, the processor 602 instructs the communication interface 606 to initiate a call with a second user terminal. The communication interface 606 receives a session invitation from a voicemail server in response to the second user terminal being unavailable or unresponsive to the placed call. The communication interface 606 further receives an instruction to perform an offline recording from the voicemail server. The session between the user terminal 600 and the voicemail server is terminated. The processor 602 initiates a message recording after the session has been terminated and stores the recorded message in the memory 604. The processor 602 instructs the communication interface 604 to transmit the recorded message, which is associated with the terminated session, to the voicemail server.

The present disclosure takes advantage of the familiarity of the conventional voice/video mail experience where a server-side personalized greeting is played and provides the guaranteed user experience of an offline client-based solution which is not dependent on network conditions nor an active session with a sever.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for offline message recording, performed by a first user terminal, the method comprising:
   initiating a call with a second user terminal;
   establishing a connection with a messaging server in response to an unavailability of the second user terminal;
   recording a message in response to terminating the connection between the first user terminal and the messaging server; and
   transmitting the recorded message to the messaging server.

2. The method of claim 1, wherein transmitting the recorded message to the messaging server is performed in response to evaluating a network condition.

3. The method of claim 1, further comprising, receiving a terminate connection message from the messaging server.

4. The method of claim 3, wherein the terminate connection message includes an instruction to perform an offline recording.

5. The method of claim 1, further comprising, transmitting, to the messaging server, an indication that the recorded message is associated with the terminated connection.

6. A first user terminal, the first user terminal comprising circuitry including a processor and a memory, the memory containing instructions executable by the processor whereby the first user terminal is operative to:
   initiate a call with a second user terminal;
   establish a connection with a messaging server in response to an unavailability of the second user terminal;
   record a message in response to terminating the connection between the first user terminal and the messaging server; and
   transmit the recorded message to the messaging server.

7. The first user terminal of claim 6, wherein the transmission of the recorded message is performed in response to the processor evaluating a network condition.

8. The first user terminal of claim 6, further operative to transmit an indication that the recorded message is associated with the terminated connection.

9. The first user terminal of claim 6, further operative to, receive a terminate connection message from the messaging server.

10. The first user terminal of claim 9, wherein the terminate session message includes an instruction to perform an offline recording.

11. A method for offline message recording, performed by a first user terminal, the method comprising:
    initiating a call towards a second user terminal;
    recording an offline message in response to detecting an unavailability of the second user terminal; and
    transmitting the offline recorded message to a messaging server.

12. The method of claim 11, wherein transmitting the offline recorded message to the messaging server is performed in response to evaluating a network condition.

13. The method of claim 11, further comprising, establishing a connection with the messaging server in response to the unavailability of the second user terminal.

14. The method of claim 13, further comprising, terminating the connection with the messaging server.

15. The method of claim 13, further comprising, terminating the connection with the messaging server responsive to receiving a terminate connection message from the messaging server.

16. The method of claim 15, wherein the terminate connection message includes an instruction to perform an offline recording.

17. The method of claim 15, further comprising, transmitting, to the messaging server, an indication that the offline recorded message is associated with the terminated connection.

18. A first user terminal, the first user terminal comprising circuitry including a processor and a memory, the memory containing instructions executable by the processor whereby the first user terminal is operative to:
    initiate a call towards a second user terminal;
    record an offline message in response to detecting an unavailability of the second user terminal; and
    transmit the offline recorded message to a messaging server.

19. The first user terminal of claim 18, wherein transmitting the offline recorded message to the messaging server is performed in response to evaluating a network condition.

20. The first user terminal of claim 18, further operative to, establish a connection with the messaging server in response to the unavailability of the second user terminal.

21. The first user terminal of claim 20, further operative to, terminate the connection with the messaging server.

22. The first user terminal of claim 20, further operative to, terminate the connection with the messaging server responsive to receiving a terminate connection message from the messaging server.

23. The first user terminal of claim 22, wherein the terminate connection message includes an instruction to perform an offline recording.

24. The first user terminal of claim 22, further operative to, transmit, to the messaging server, an indication that the offline recorded message is associated with the terminated connection.

* * * * *